United States Patent [19]
Hara

[11] Patent Number: 6,123,270
[45] Date of Patent: Sep. 26, 2000

[54] WORK MACHINING METHOD AND APPARATUS FOR SUPPLYING MIST USED THEREIN

[75] Inventor: Mitsugu Hara, Osaka, Japan

[73] Assignee: Ecoreg Ltd., Osaka, Japan

[21] Appl. No.: 09/225,297

[22] Filed: Jan. 5, 1999

[30] Foreign Application Priority Data

Sep. 8, 1998 [JP] Japan .................................. 10-254400

[51] Int. Cl.[7] .................................................. A62C 5/02
[52] U.S. Cl. ........................ 239/8; 239/422; 239/425; 408/56; 408/61; 451/450
[58] Field of Search .................. 239/8, 10, 13, 239/306, 307, 418, 422, 424, 424.5, 427, 428, 548, 549, 552, 425; 82/50, 1.11; 408/56, 61; 451/450, 488

[56] References Cited

U.S. PATENT DOCUMENTS

| | | | |
|---|---|---|---|
| 2,475,811 | 7/1949 | Wagner et al. | 451/450 |
| 3,398,609 | 8/1968 | Schott | 239/424 |
| 3,547,350 | 12/1970 | Marcoux | 239/308 |
| 3,570,332 | 3/1971 | Beake | 239/424 |
| 3,577,808 | 5/1971 | Visser | 408/61 |
| 3,701,480 | 10/1972 | Kuhner et al. | 239/420 |
| 4,407,450 | 10/1983 | Chegolya et al. | 239/8 |
| 4,708,539 | 11/1987 | Threadgill | 408/61 |
| 4,778,315 | 10/1988 | Duffy et al. | 409/136 |
| 5,678,466 | 10/1997 | Wahl | 83/168 |

FOREIGN PATENT DOCUMENTS 6-320384  11/1994  Japan .
9-141537   6/1997  Japan .

*Primary Examiner*—Andres Kashnikow
*Assistant Examiner*—Jorge Bocanegra
*Attorney, Agent, or Firm*—Armstrong, Westerman, Hattori, McLeland & Naughton

[57] ABSTRACT

A work machining method including ejecting from a nozzle a plurality of liquids separately toward a workpiece to be machined and a machining part and mixing the liquids each other as the liquids are made in a mist form; whereby the liquids in a mist form are supplied toward the workpiece to be machined and the machining part, and an apparatus for supplying mist including an air supply tube having an ejection nozzle installed in a work machining apparatus; the air supply tube having a hole on a point of the ejection nozzle and an air outlet in a peripheral area of the injection nozzle; and a cooling water supply tube and an oil cutting fluid supply tube within the air supply tube; wherein each open end of the supply tubes is opened to the hole of the ejection nozzle. With this method and apparatus, the quality of the liquids may not deteriorate, a cooling effect and lubricity are provided at the same time on the parts, and further the pressure of compressed air, water and oil can be separately regulated.

5 Claims, 5 Drawing Sheets

WORK MACHINING METHOD AND APPARATUS FOR SUPPLYING MIST USED THEREIN

BACKGROUND OF THE INVENTION

1. Field of the Invention

The present invention relates generally to a work machining method such as machine cutting and grinding and an apparatus for supplying mist which may be used in the method.

2. Description of the Prior Art

To dissipate heat generated by contact between a workpiece and a machine tool during machine cutting or grinding, conventionally a liquid is delivered from a water-supply nozzle extending toward the machining position. For example, in a machining center (a complex machine tool) as shown in FIG. 7, a tool holder 2 is installed on the lower end of a spindle (not shown) of a body 1 and a tool connecting axis 3 is to be engaged with a machining tool 4, to which a water supply nozzle or an air supply tube 5 extends from the body 1. However, in machining using a large-scale stand type machine tool like this machining center, there may be a situation where machining performance is adversely deteriorated because water or debris easily accumulates inside a machined recess. In addition, when machining by intermittently contacting a carbide machining tool with a workpiece, the temperature rises on the machining point of the cutting edge due to generated heat while the cutting edge simultaneously is being cooled by the liquid delivery. Thus, repeated sudden thermal changes may cause the so called "chipping" phenomena or cracks.

For this reason, liquid is sprayed in a mist toward a workpiece and a machining tool so as to impart lubricity instead of liquid delivery. According to this method, the inconvenience of water accumulation within the recess may be avoided or the chipping phenomena by sudden cooling may not be caused. However, this method has problems in that lubricity is not sufficient when using water as the liquid for the mist, and in that the cooling effect is not sufficient when using oil as the liquid for the mist. For example, an oil feeder and an oil feeding method for supplying the oil in a mist form are proposed by TOKKAIHEI 9-141537.

Therefore, as a method to realize cooling effect and lubricity by ejecting liquid in a mist form for machining a workpiece has been proposed by TOKKAIHEI 6-320384. According to this method, instead of only one kind of a liquid being ejected in a mist form, two or more kinds of liquids are mixed and ejected in a mist form. An ejection nozzle 51 as shown in FIG. 8 is connected to an end of an air supply tube 5 as shown in FIG. 7. In nozzle 51 two branch liquid supply tubes 52a, 52b are branched away from a liquid supply tube 52 connected to one side (the right side in FIG. 8) of the ejection nozzle 51. The branch tube 52a supplies water while the other branch tube 52b supplies oil. When compressed air is supplied from the air supply tube 5, as shown by an arrow P in FIG. 8, a piston 54 held by a compression spring 53 is pushed toward the opposite side (left side in FIG. 8) in the nozzle 51 so that a liquid passage 55 connected to the liquid supply tube 52 is opened. Consequently, water and oil are sprayed out in mixed fine particles from the very small outlets of nozzles 56 and 57 which are branched off toward the right and left, respectively.

In machining a workpiece in this machining center, when compressed air is supplied to the air supply tube 5 and also water and oil are supplied to the liquid supply tube 52, a liquid mixture of water and oil is ejected from the ejection nozzle 51. The water and oil, which coexist in fine particles, collide with a surface of a workpiece to be machined as well as with a surface of a machining tool to be pressed on the workpiece. The oil particles mainly increase lubricity while water mainly dissipates the heat produced during machining.

However, according to the above method, in mixing the oil and water, the quality of thus obtained liquid mixture may deteriorate, resulting in insufficient lubricity. Further, it is difficult to mix water and oil, resulting in insufficient mixing in the mixture liquid. As a result, it is difficult to impart both the cooling effect and lubricity at the same time between the surface of the workpiece and the surface of the machining tool. Still further, since the water and oil are injected together into the nozzle with the injection of compressed air, it is not possible to separately regulate the injection pressures of each of the compressed air, water and oil.

In view of the foregoing, it is an object of the present invention to provide a method for machining workpieces and an apparatus for supplying mist used therein, whereby quality of the liquids may not deteriorate, a cooling effect and lubricity are rendered at the same time between the part to be machined and the machining part, and the injecting pressure of each of the compressed air, water and oil can be separately regulated.

SUMMARY OF THE INVENTION

In accordance with a first aspect of the present invention, there is provided a work machining method comprising the steps of ejecting from an ejection nozzle a plurality of liquids separately toward a workpiece to be machined and a machining part and mixing the liquids with each other as the liquids are made in a mist form; whereby the liquids in mist form are supplied toward the workpiece to be machined and the machining part.

In accordance with a second aspect of the present invention, there is provided an apparatus for supplying mist comprising an air supply tube having a nozzle adapted to be installed in an apparatus for work machining, the nozzle having a hole on point thereof and an air outlet in a peripheral area; and a plurality of liquid supply tubes in the air supply tube; an wherein each open end of each of the liquid supply tubes opening to the hole of the nozzle; whereby when compressed air is supplied to the air supply tube and different liquids are supplied to each of the liquid supply tubes, the compressed air supplied to the air supply tube is ejected from the air outlet of the nozzle and moved toward the hole so as to collide with the liquids ejected from each open end of the liquid supply tubes.

In accordance with a third aspect of the present invention, there is provided a work machining method comprising steps of separately ejecting different liquids from a plurality of nozzles to a workpiece to be machined and a machining part, respectively; making the liquids into a mist form; and supplying each of the liquids in the mist form to the workpiece to be machined and the machining part.

In accordance with a fourth aspect of the present invention, there is provided an apparatus for supplying mist comprising a plurality of air supply tubes each having an ejection nozzle installed in an apparatus for work machining, each tube having a hole is made on a point of the ejection nozzle and an air outlet in a peripheral area of the ejection nozzle and; a liquid supply tube in each of the air supply tubes, an open end of each the liquid supply tubes being open to the ejection hole of the injection nozzle;

whereby when compressed air is supplied to the respective air supply tubes and different liquids are supplied to each of the liquid supply tubes, the compressed air supplied to the air supply tubes is ejected from the air outlet of the ejection nozzle and moves toward the hole so as to collide with the liquids ejected from each open end of the liquid supply tubes.

EFFECT OF THE INVENTION

In the first method for machining workpieces according to the present invention, the work machining method comprises the steps of ejecting from an ejection nozzle a plurality of liquids separately toward a workpiece to be machined and a machining part and mixing the liquids with each other as the liquids are made into a mist form whereby the liquids in a mist form are supplied toward the workpiece to be machined and the machining part. In the case that a plurality of liquids are ejected from the ejection nozzle and then mixed, the time necessary for mixing liquids with each other is short, resulting in substantially no deterioration in quality of each liquid. Further, since the liquids are made into a mist form and then mixed, each liquid is sufficiently mixed, resulting in providing both a cooling effect and lubricity on each of the workpiece to be machined and the machining part. Still further, it is convenient because each injection pressure of the fluids can be separately regulated.

In the second method for machining works according to the present invention, a work machining method comprises steps of ejecting different liquids separately from a plurality of ejection nozzles to a workpiece to be machined and a machining part, respectively; making the liquids into a mist form; and supplying each of the liquids in a mist form to the workpiece to be machined and the machining part. In this case, since different liquids are separately ejected from the ejection nozzles, and each are made into a mist form, each liquid may not be mixed, resulting in no deterioration in quality. In addition, in the case that the liquids are mixed as the liquids are made in a mist form after being ejected, the time for mixing the liquids with each other is short, resulting in substantially no deterioration in quality of each liquid. Further, since each liquid in a mist form is separately supplied to each of the part to be machined and the machining part, it is possible to select a location where each liquid is supplied in accordance with the specific properties of each liquid, in order to render a maximum cooling effect and lubricity. Still further, it is convenient because each injection pressure of the fluids can be separately regulated.

In the first method of machining workpieces according to the present invention, in the case where compressed air is ejected from the ejection nozzle toward the plurality of liquids ejected from the ejection nozzle so that the flow of the compressed air collides with the liquids, whereby the liquids are mixed each other as the liquids are made into a mist form, and also in the case where compressed air is ejected from each of the ejection nozzles toward the liquids ejected from each of the ejection nozzles and the liquids collide with a flow of the compressed air so as to be made in a mist form, the construction for an apparatus to accomplish this method is simple because the mist can be made by ejecting the compressed air using the nozzle for the liquids.

In the second method of machining workpieces according to the present invention, in the case that cooling water is ejected from one of the ejection nozzles and made in a mist form and is supplied to a face side of a tool while a cutting fluid is ejected from another nozzle and made in a mist form and is supplied to a flank side of the tool, the face side of the machining tool can be cooled by the mist of the cooling water, while the flank side of the machining tool can be lubricated by the mist of the oil cutting fluid. In the present invention, "a face side of a machining tool" means not only a face side of a machining tool and its adjacent portion, but also cuttings for a workpiece, or all together of the face side, its adjacent portion and cutting. In addition, in the present invention, "a flank side of a machining tool" means not only a flank side of a machining tool and its adjacent portion, but also a machined surface of a workpiece, or all together of the flank side, its adjacent portion and the machined surface of a workpiece.

On the other hand, the first apparatus for supplying mist of the present invention comprises an air supply tube having an ejection nozzle installed in an apparatus for work machining, wherein the nozzle has an ejection hole on point thereof and an air outlet is made in a peripheral area of the nozzle; and a plurality of liquid supply tubes made in the air supply tube; wherein each open end of the liquid supply tubes is opened to the hole of the nozzle.

Therefore, the first method for machining workpieces according to the present invention can be conducted by supplying compressed air to the air supply tube and supplying different liquids to each of the liquid supply tubes. Further, since the compressed air supplied to the air supply tube is ejected from the air outlet of the ejection nozzle and moved toward the injection hole, such movement causes the adjacent air to corresponding flow so that the amount of air colliding with the liquids can be increased.

The second apparatus for supplying mist of the present invention comprises a plurality of air supply tubes each having an ejection nozzle installed in an apparatus for work machining, wherein an injection hole is made on a point of the ejection nozzle and an air outlet is made in a peripheral area of the ejection nozzle and; a liquid supply tube made in each of the air supply tubes, wherein each open end of the liquid supply tube is opened to the ejection hole of the ejection nozzle.

Therefore, the second method for machining workpieces according to the present invention can be conducted by supplying compressed air to the respective air supply tubes and supplying different liquids to each of the liquid supply tubes. Further, the compressed air supplied to the air supply tubes is ejected from the air outlet of the ejection nozzle and moved toward the ejection hole, such movement causes the adjacent air to correspondingly flow so that the amount of air collides with the liquids can be increased.

DETAILED DESCRIPTION OF THE PREFERRED EMBODIMENTS

With reference to the attached drawings, the present invention will hereinafter be described by way of embodiments thereof.

Figure 1:
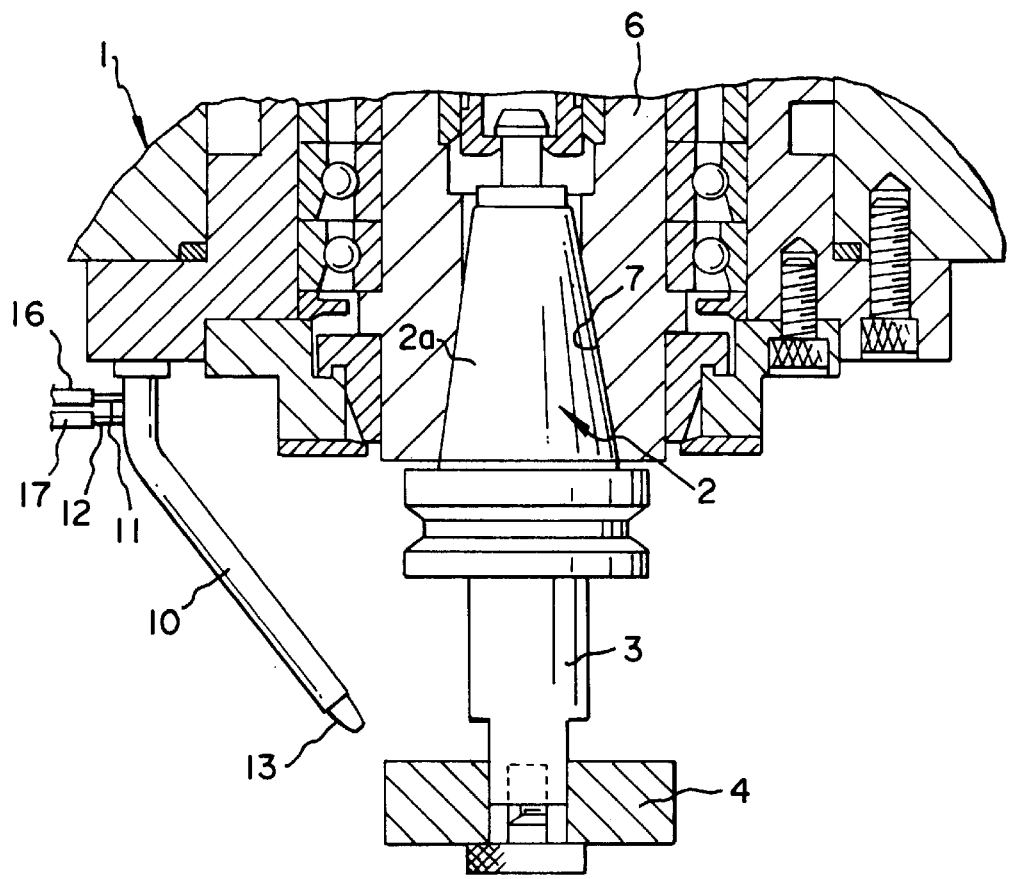
FIG. 1 is a sectional view illustrating a machining center according to one embodiment of the present invention.

FIG. 1 is a diagram illustrating a machining center 1 according to one embodiment of the present invention. The basic construction of this machining center 1 is as same as that of conventional one. That is, a spindle 6, which rotates at a high-speed, is held via a bearing inside the machining center 1. A tapered chuck 7 is provided at a lower end of the spindle 6. A taper 2a for engagement in a tool holder 2 is inserted and held detachably in the tapered chuck 7. A machining tool 4 is installed on a tool connecting axis 3 which is a lower part of the tool holder 2.

Figure 2:
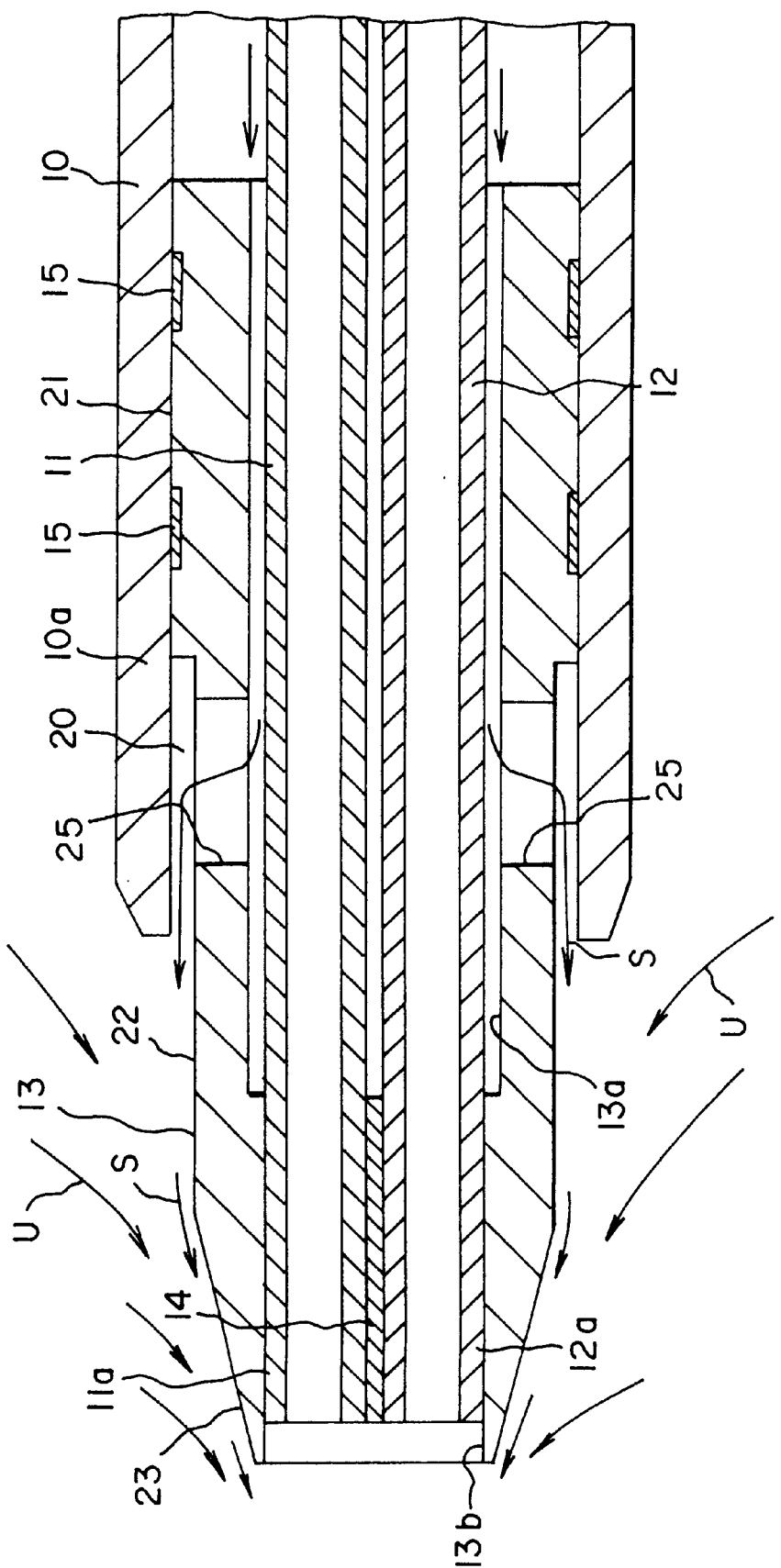
FIG. 2 is a sectional view of a nozzle body used in an apparatus for supplying mist according to the present invention.
Figure 3:
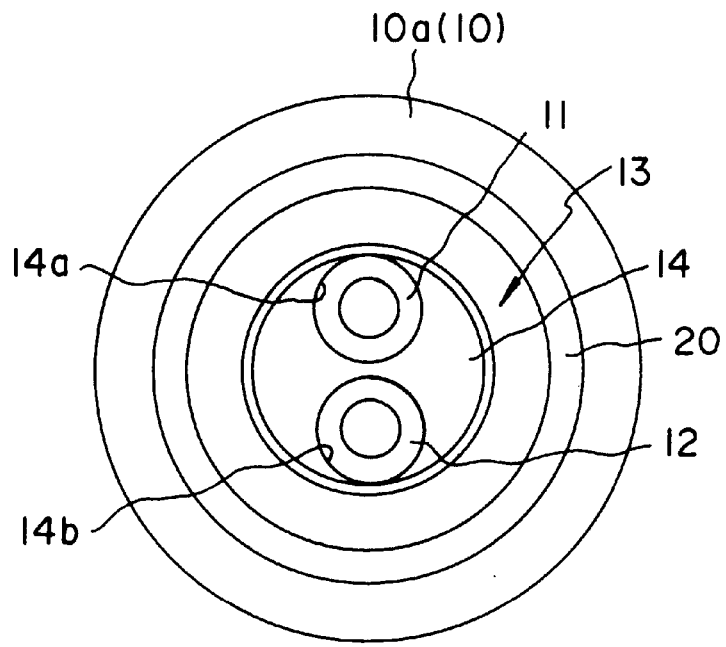
FIG. 3 is a front view of the nozzle body of FIG. 2.

An apparatus for supplying mist is installed on the lower end of the machining center 1. The apparatus for supplying mist comprises an air supply tube 10, which perpendicularly extends slightly from the machining center 1 and then extends so as to be tilted inwards; a cooling water supply tube 11, a portion of which is located inside the air supply tube 10 as shown in FIG. 2; an oil cutting fluid supply tube 12 also is located inside the same air supply tube 10 as shown in FIG. 2; a generally-cylindrical nozzle body (an injection nozzle) 13; wherein one side of the nozzle body 13 (right side in FIG. 2) is engaged within an open end 10a of the air supply tube 10, while the other end (left side in FIG. 2) projects from the open end 10a; wherein both ends of the cooling water supply tube 11 and the oil cutting fluid supply tube 12 are inserted into an inner hole 13a of the nozzle body 13. In addition, as shown in FIG. 3, a holding plate 14 is fixed in an air-tight state at an open end 13b of the nozzle body 13, such that each open end 11a, 12a of the cooling water supply tube 11 and the oil cutting fluid supply tube 12 is held and fixed in an air-tight state to a pair of through holes 14a, 14b, respectively, arranged in the holding plate 14. In FIG. 2, 15 is a sealer.

The open upper part of the air supply tube 10 is connected with air supply means such as a compressor (not shown) via air supply line located inside the machining center 1. Ends of the cooling water supply tube 11 and the oil cutting fluid supply tube 12 respectively project from the upper part of the air supply tube 10 (see FIG. 1) and are connected via a cooling water connecting tube 16 and an oil cutting fluid connecting tube 17, respectively, with cooling water supply means (not shown), such as a cooling water tank of, for example, tap water, a pump and the like, and oil cutting fluid supply means (not shown), such as a oil cutting fluid tank (Bluebe #LB-1 available from US ITW Corporation), a pump and the like. In addition, in the air supply tube 10, the air supply line or the air supply means, in the cooling water supply tube 11, the cooling water connecting tube 16 or the cooling water supply means, and in the oil cutting fluid supply tube 12, the oil cutting fluid connecting tube 17 or the oil cutting fluid supply means, a pressure regulating valve (not shown) is provided, respectively, so that compressed air, cooling water and oil cutting fluid, at a specified set pressure respectively, are supplied to the air supply tube 10, the cooling water supply tube 11 and the oil cutting fluid supply tube 12.

On the outer periphery of the nozzle body 13, in order from the right hand side thereof as shown in FIG. 2, are a larger-diameter peripheral surface 21 engaged with an inner peripheral surface of the open end 10a of the air supply tube 10, a smaller-diameter peripheral surface 22 formed so as to be stepped down from the larger-diameter peripheral surface 21 (i.e., formed so as to have a smaller diameter than the open end 10a of the air supply tube 10), and a tapered surface part 23 wherein the size of the tapered part gradually becomes smaller in diameter from the small-diameter peripheral surface 22 toward a distal end so as to be shaped into a frustum of right circular cone, the right side portion of the small-diameter peripheral surface 22 being positioned within the open end 10a of the air supply tube 10. Consequently, an annular gap 20 is formed between the open end 10a of the air supply tube 10 and the right side portion of the small-diameter peripheral surface 22.

The inner bore 13a of the nozzle body 13, except for an open end 13b, is formed to define sufficient space for the cooling water supply tube 11 and the oil cutting supply tube 12. Except for the open end 13b, eight air circulation holes (air outlets) 25 are formed radially and equidistantly at positions corresponding to the right side portion of the smaller-diameter peripheral surface 22.

In the above construction, when air is supplied to the air supply tube 10, cooling water is supplied to the cooling water supply tube 11 and oil cutting fluid is supplied to the oil cutting fluid tube 12, cooling water is ejected from the open end 11a of the cooling water supply tube 11 and oil cutting fluid is ejected from the open end 12a of the oil cutting fluid supply tube 12, respectively. At the same time, air supplied to the air supply tube 10 flows into the inner bore 13a of the nozzle body 13, then into the gap 20 via each of the air circulation holes 25, and subsequently along the smaller-diameter peripheral surface 22 and the tapered surface part 23 (as shown by an arrow S), and finally collides with cooling water ejected from the open end 12a of the cooling water supply tube 11 and with oil cutting fluid ejected from the open end 12a of the oil cutting fluid supply tube 12. Consequently, the cooling water and the oil cutting fluid become fine particles and are formed into a mist, thereby resulting in mist mixture. On the other hand, when compressed air flows along the smaller-diameter peripheral surface 22 and the tapered surface part 23 of the nozzle body 13, the compressed air creates a flow of adjacent air so as to form a subsidiary flow as shown by an arrow U. For this reason, the subsidiary flow increases the mist mixture to a large amount of flow. In addition, the flow of the increased mist mixture has a strong thrust and strongly collides with the machined part of a workpiece and with the machining part of the machining tool 4 to be pressed on the workpiece.

As described in the above embodiment, since the cooling water and the oil cutting fluid are first formed into the form of a mist and then mixed together, both are fully mixed. Further, since the cooling water and the oil cutting fluid are not mixed within the nozzle body 13, time reduction for mixing thereof can prevent the oil cutting fluid from becoming substantially deteriorated. Still further, the mist mixture has sufficient power to blow off debris and the like generated during machining, thereby preventing debris and the like from remaining around the part to be machined and the machining part. In addition, since a large amount of flow of the mist mixture is applied, enhancement of the cooling effect results. Even still further, since the injected mist mixture properly moistens the machined workpiece and the machining tool 4 so as to increase lubricity, good processability results. Therefore, the burden of the machining tool 4 is decreased and also sudden cooling such as liquid caused by delivery may not be incurred thereon so that intermittent thermal impact may not result, resulting in prolonged service life of the machining tool. In addition, there is an advantage that the injection pressure of each of the compressed air, the cooling water and the oil cutting fluid can be changed depending on the desired machining conditions.

Figure 4:
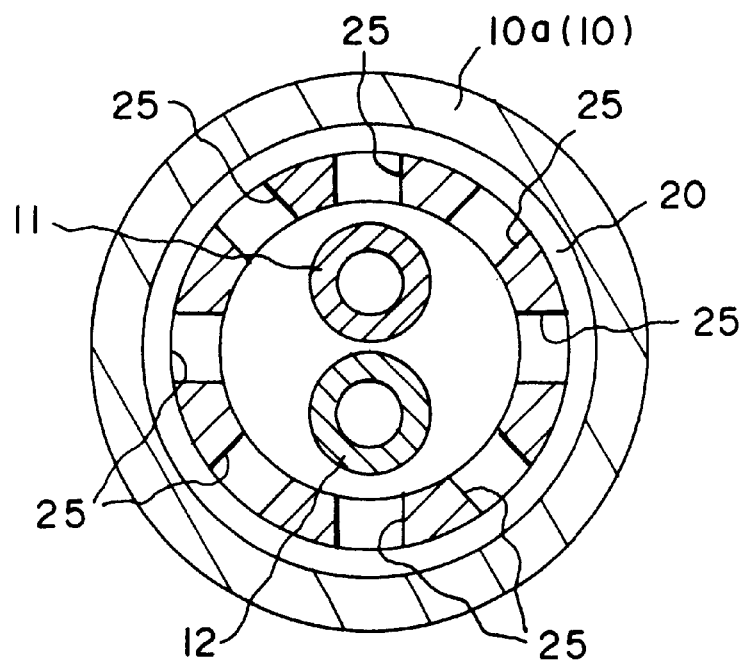
FIG. 4 is a sectional view of the essential part of the nozzle body of FIG. 2.
Figure 5:
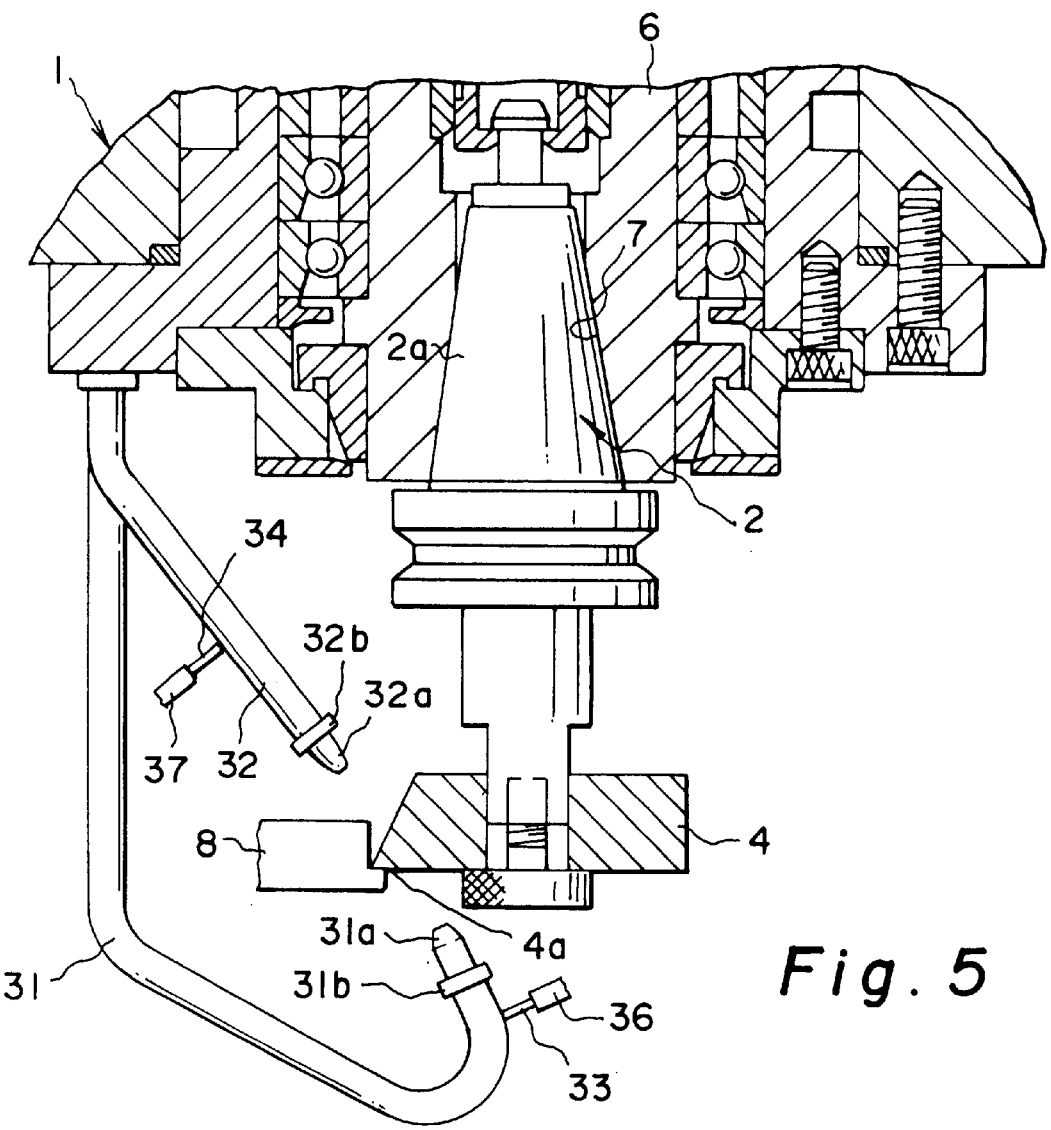
FIG. 5 is a sectional view illustrating the construction of a machining center according to another embodiment of the present invention.

FIG. 5 illustrates a machining center according to another embodiment of the present invention. The basic construction of the machining center is the same as the embodiment shown in FIG. 1. In FIG. 5, the same components as shown in FIG. 1 are denoted by the same reference numerals. In the FIG. 4a is debris and 8 is a workpiece.

According to this embodiment, in an apparatus for supplying mist, a first and a second air supply tubes 31 and 32 extends downward, respectively, from a lower end of a machining center body 1. A cooling water supply tube 33 is located inside the first air supply tube 31 while an oil cutting fluid tube 34 is located inside the second air supply tube 32, both in the manner shown in FIG. 6. An open end of the cooling water supply tube 33 is fixed in an air-tight state to an ejection nozzle 31a of the first air supply tube 31, while an open end of the oil cutting fluid supply tube 34 is fixed in an air-tight state to ejection nozzle 32a of the second supply tube 32. The ejection nozzle 31a of the first air supply tube 31 is positioned toward a face side of the machining tool 4, while the injection nozzle 32a of the second air supply tube 32 is positioned toward a flank side thereof. In FIG. 5, 36 and 37, respectively, are connecting tubes for the cooling water supply tube 33 and for the oil cutting fluid supply tube 34.

Figure 6:
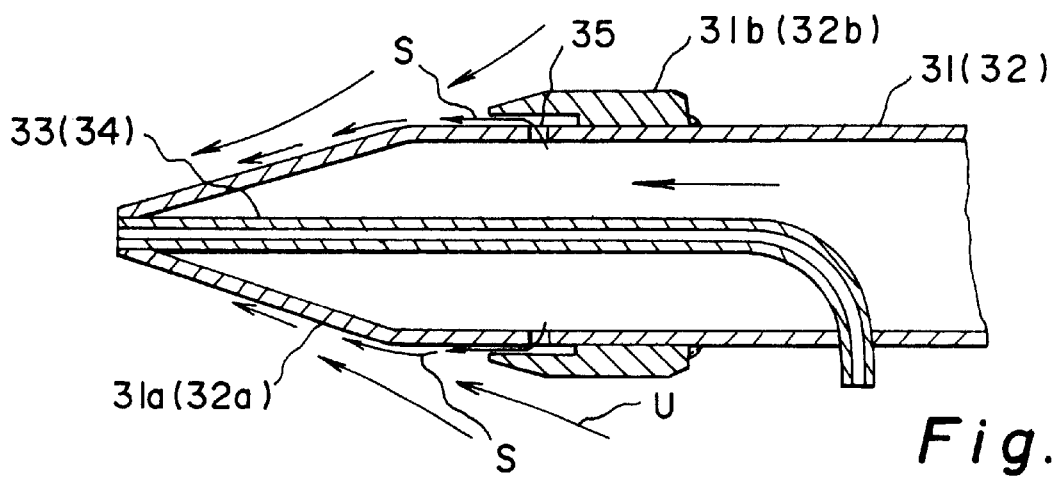
FIG. 6 is a sectional view illustrating the essential portion of an air supply tube used in the apparatus for supplying mist according to the present invention.
Figure 7:
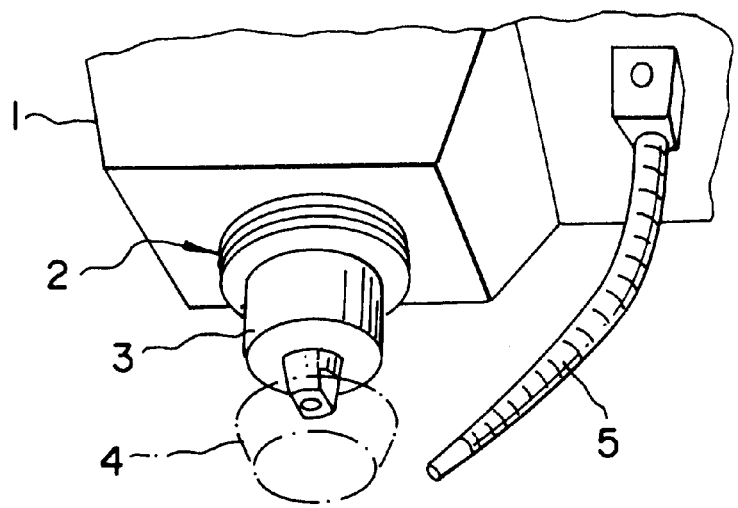
FIG. 7 is a perspective view illustrating a method of water delivery in a conventional work machining method.
Figure 8:
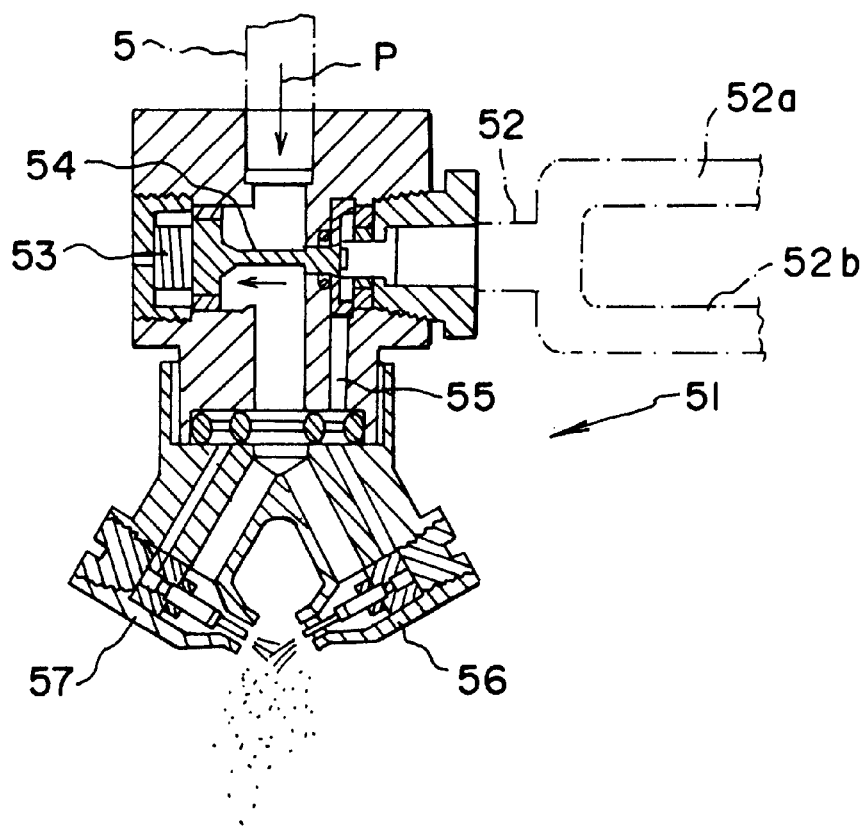
FIG. 8 is a sectional view illustrating a conventional nozzle for ejecting mist.

In addition, guide rings 31b, 32b externally engage with each peripheral surface of the air supply tubes 31, 32, respectively, whereby air is ejected as shown by an arrow S in FIG. 6 from a gap 35 between each outer peripheral surface of the air supply tubes 31, 32 and each inner peripheral surface of the guide rings 31b, 32b, respectively, so as to cause adjacent air to flow in a subsidiary flow as shown by an arrow U.

In the above construction, when compressed air is supplied to the air supply tubes 31 and 32, cooling water is supplied to the cooling water supply tube 33 and oil cutting fluid is supplied to the oil cutting fluid tube 34, cooling water is supplied in a mist form from the ejection nozzle 31a of the first air supply tube 31 to a face side of the machining tool 4, and oil cutting fluid is supplied in a mist form from the ejection nozzle 32a of the second air supply tube 32 to a flank side of the machining tool 4. In addition, when the compressed air supplied to air supply tubes 31 and 32 flows along the outer peripheral surface of the ejection nozzles 31a and 32a, it creates a subsidiary flow of air. For this reason, the mist which is superior in cooling effect and which can also eliminate debris is supplied thereto.

As mentioned above, the same action and effect in this embodiment can be obtained as in the first embodiment. Further, since cooling water is supplied in a mist form to a face side of the machining tool 4, while the oil cutting fluid is supplied in a mist form to a flank side of the machining tool 4, a superior cooling effect and lubricity can be obtained.

Since the cooling effect and lubricity vary greatly depending upon the type of mist generated, it is preferred that the amount of each the cooling water supplied to the cooling water supply tubes 11, 33 and the oil cutting fluid supplied to supply tubes 12, 34 are regulated so as to adjust the mixing ratio thereof, or the injection pressure of each of the compressed air, cooling water and oil cutting fluid injected from the air supply tubes 10, 31 and 32, the cooling water supply tubes 11, 33 and the oil cutting fluid supply tubes 12, 34, respectively, be regulated. For example, in the case of high-speed cutting, the ratio of water between cooling water and oil cutting fluid may be increased so as to increase cooling effect, while in the case of medium-or low-speed cutting, the ratio of oil cutting fluid may be increased so as to increase lubricity.

In addition, in both of the above embodiments, the average particle diameter of the mist ejected from the cooling water supply tubes 11, 33 generally depends upon machining conditions. However, it is preferred to usually have the average particle diameter within a range of about 3 to 10 μm. It is preferred that the amount of the ejected mist therefrom is usually within a range of about 0.5 to 5 cc/min. On the other hand, the average particle diameter of the mist injected from the oil cutting fluid tubes 12, 34 generally depends upon machining conditions. However, it is preferred to usually have this particle diameter within a range of about 3 to 10 μm. It is preferred that the amount of the ejected mist therefrom is usually within a range of about 0.1 to 0.5 cc/min.

In addition, in both of the above embodiments, tap water is used as the cooling water. However, such is not critical, and pure water or super pure water may be used. Further, in the above both embodiments, Bluebe #LB-1 is used as the oil cutting fluid. This fluid is not critical, and various conventional oil cutting fluids may be used. Still further, in the above both embodiments, two kinds of liquids, i.e., cooling water and oil cutting fluid are used. However, these are not critical, and an emulsion, a chemical agent, or the like may be used. Even still further, the number of liquids is not limited to two kinds as three or more liquids may be mixed and used.

In addition, the application of the apparatus of the present invention may not be limited to a machining center as described the above in connection with both embodiments. The apparatus may be applicable to various machine tools such as NC lathes and grinders.

In both of the above embodiments, the compressed air supply line for supplying the compressed air to the air supply tubes 10, 31 and 32 is formed inside the machining center body 1. This arrangement is not critical, and the compressed air supply line may be located outside the machining center 1. In addition, the cooling water supply tubes 11, 33 and the oil cutting fluid supply tubes 12, 34 are described and shown as being located outside the machining center body 1. However, these tubes may be formed inside the machining center body 1.

What is claimed is:

1. A method for machining workpiece comprising the steps of:

ejecting a plurality of liquids separately from a point of an ejection nozzle toward a workpiece to be machined and a machining part;

ejecting compressed air from a peripheral area of the nozzle toward the plurality of liquids ejected from the point of the nozzle so that a flow of the compressed air and a subsidiary flow of adjacent air accompanying therewith collide with the liquids, whereby the liquids are mixed with each other as the liquids are made in a mist form; and machining the workpiece as the liquids in a mist form are supplied toward the workpiece to be machined and the machining part.

2. An apparatus for supplying mist comprising:

an air supply tube having an ejection nozzle and adapted to be installed in an apparatus for work machining, wherein the ejection nozzle has a hole on a point thereof and an air outlet in a peripheral area of the nozzle;

a plurality of liquid supply tubes within the air supply tube;

wherein an open end of each of the liquid supply tubes is opened to the hole of the ejection nozzle;

whereby compressed air is supplied to the air supply tube and different liquids are supplied to each of the liquid supply tubes; and means, installed near the air outlet of the nozzle, for ejecting the compressed air supplied to the air supply tubes from the air outlet of the nozzle and moving thereof toward the hole so as to accompany adjacent air therewith, whereby a flow of the compressed air and a flow of adjacent air collide with the liquids ejected from the open end of each of the liquid supply tubes.

3. A work machining method comprising steps of:

ejecting different liquids separately from a point of each of a plurality of ejection nozzles toward a workpiece to be machined and a machining part;

ejecting compressed air from a peripheral area of each of the nozzles toward the liquids ejected from each nozzle so that a flow of each of the compressed air and a subsidiary flow of each of the adjacent air accompanying therewith collide with the liquids so as to be made into a mist form; and machining the workpiece as each of the liquids in a mist form is supplied to the workpiece to be machined and the machining part, respectively.

4. A method as set forth in claim 3, wherein cooling water is ejected from one of the ejection nozzles and made into a mist form and is supplied to a face side of the machining part while a cutting fluid is injected from another nozzle and made in a mist form and is supplied to a flank side of the machining part.

5. An apparatus for supplying mist comprising:

a plurality of air supply tubes each having an ejection nozzle and adapted to be installed in an apparatus for work machining, a hole being on a point of the ejection nozzle and an air outlet being in a peripheral area of the ejection nozzle;

a liquid supply tube within each of the air supply tubes, an open end of the liquid supply tube opens to the hole of the ejection nozzle, whereby compressed air is supplied to the respective air supply tubes and different liquids are supplied to the respective liquid supply tubes; and means, installed near the air outlet of each nozzle, for ejecting the compressed air supplied to the air supply tubes from each air outlet of the nozzle and moving thereof toward the hole of each nozzle so as to accompany adjacent air therewith, whereby a flow of the compressed air and a flow of the adjacent air collide with the liquids ejected from the open end of each of the liquid supply tubes.

* * * * *